United States Patent [19]
Yasui

[11] Patent Number: 5,963,605
[45] Date of Patent: Oct. 5, 1999

[54] BURST FRAME PHASE SYNCHRONIZING CIRCUIT AND BURST FRAME PHASE SYNCHRONIZING METHOD UTILIZING A FRAME SYNCHRONIZING SIGNAL SATISFYING A CALCULATED PROTECTION CONDITION

[75] Inventor: Hiroyuki Yasui, Tokyo, Japan

[73] Assignee: NEC Corporation, Tokyo, Japan

[21] Appl. No.: 08/861,653

[22] Filed: May 22, 1997

[30] Foreign Application Priority Data

May 22, 1996 [JP] Japan .................................. 8-126854

[51] Int. Cl.⁶ ...................................... H04J 3/06
[52] U.S. Cl. ............................. 375/368; 370/512
[58] Field of Search ..................... 375/224, 354, 375/362, 365, 368; 371/1, 5.1, 5.4, 47.1; 370/324, 350, 503, 509, 512, 514

[56] References Cited

U.S. PATENT DOCUMENTS

| | | | |
|---|---|---|---|
| 4,414,676 | 11/1983 | Kraul et al. | 375/368 |
| 4,675,722 | 6/1987 | Hackett | 348/530 |
| 5,570,370 | 10/1996 | Lin | 370/347 |
| 5,592,518 | 1/1997 | Davis et al. | 375/368 |

FOREIGN PATENT DOCUMENTS 9-312638  12/1997  Japan .

*Primary Examiner*—Young T. Tse
*Attorney, Agent, or Firm*—Sughrue, Mion, Zinn, Macpeak & Seas, PLLC

[57] ABSTRACT

A burst frame phase synchronizing circuit is disclosed, whereby the generation of erroneous synchronization caused by the phase fluctuation of received data or a bit error is prevented. A transmission error monitoring circuit 15 monitors a transmission error and outputs error information, and a transmission error statistical circuit 14 outputs protection information obtained by summing up the statistics of transmission errors. A frame synchronizing pattern comparator circuit 11 makes a comparison for bit strings between burst data at the time of transmission and a specified synchronizing pattern and outputs comparison information obtained based on the production state of a noncoincidence bit. A synchronization protective circuit 13 selects a permissible noncoincidence bit number and outputs a frame synchronizing signal satisfying a specified protection condition. Thus, since the strength of synchronization protection is flexibly switched according to a transmission line error, a synchronous bit length can be controlled without taking any unnecessarily strong synchronization protecting measures, and transmission efficiency can be improved by controlling a frame synchronous bit length.

12 Claims, 5 Drawing Sheets

BURST FRAME PHASE SYNCHRONIZING CIRCUIT AND BURST FRAME PHASE SYNCHRONIZING METHOD UTILIZING A FRAME SYNCHRONIZING SIGNAL SATISFYING A CALCULATED PROTECTION CONDITION

BACKGROUND OF THE INVENTION

The present invention relates to burst frame phase synchronization, which provides measures to prevent erroneous synchronization when synchronism is to be acquired for burst data.

Conventionally, the burst frame phase synchronizing circuit has been used particularly as one of the systems for protection against erroneous synchronization for burst data in an ATM burst multiplex transmission art. The erroneous synchronization protective system of this kind is used for the purpose of preventing entering of erroneous synchronization and longer pull-in time for the error of the transmission line of a transmission device.

As an example, FIG. 5 illustrates the circuitry of "a frame synchronizing circuit" disclosed in JP-A-(No. 2-10617/(1990).

Referring to FIG. 5, a received data string DATA is input to a clock signal reproducing circuit 21 and a frame synchronizing pattern comparator circuit 22, and received data RD is input to a burst error detecting circuit 23. The output of the reproduced clock signal CLOCK of the clock signal reproducing circuit 21 is connected to the frame synchronizing pattern comparator circuit 22, a frame counter 24 and a frame synchronizing window output circuit 25.

The outputs of the counter signals A0 to A7 of the frame counter 24 are connected to the frame synchronizing window output circuit 25. The output of the coincidence signal PDET of the frame synchronizing pattern comparator circuit 22 and the output of the frame synchronizing signal WINDOW of the frame synchronizing window output circuit 25 are respectively connected to the inputs of an AND gate 26.

The output of the frame synchronizing pattern detecting signal FDET of the AND gate 26 is connected to a frame synchronizing window length selecting circuit 27 and a frame synchronization protective circuit 28.

The output of the counter signal B0 of the frame counter 24 is connected to the frame synchronization protective circuit 28, and a frame synchronizing signal FSYNC is sent out from the frame counter 24.

The output of the hunting mode signal HUNT of the frame synchronization protective circuit 28 is connected to the frame synchronizing window length selecting circuit 27, and the output of a reset signal RESET is connected to the frame counter 24.

The output of the selecting signal SELECT of the frame synchronizing window selecting circuit 27 is connected to the frame synchronizing window output circuit 25.

The frame synchronizing circuit constructed in the foregoing manner stops a synchronization protecting operation (forward protecting operation) for a burst error generated during establishing of synchronization and monitors synchronization by widening a synchronization monitoring window when the burst error is finished. In this way, shifting or erroneous synchronization is prevented and thereby a correct synchronizing phase can be quickly recovered.

In the conventional example, however, synchronization must be re-established for a burst signal each time input burst occurs and it is meaningless to hold synchronization for an error. Accordingly, when an input signal is given in a burst condition, this system cannot process this signal.

Furthermore, in the case of burst multiplexed data, a limit is placed on the fluctuation range of a signal in order to reduce overheads for data by a synchronizing signal. In this condition, widening of the synchronization monitoring window is not effective. Accordingly, it is obvious that a problem is inherent in this conventional system. Specifically, a synchronism acquiring characteristic cannot be improved even by widening the range of synchronization monitoring.

SUMMARY OF THE INVENTION

The present invention was made in order to solve the foregoing problems.

A purpose of the present invention is to provide for burst frame phase synchronization which makes it difficult for a received data phase fluctuation or a bit error to cause erroneous synchronization.

The purpose of the present invention is achieved by a burst frame phase synchronizing circuit for acquiring synchronism for each burst packet by using a synchronous bit installed in the head of burst data, which comprises transmission error monitoring means for monitoring a transmission error produced during transmission of the burst data and outputting error information, transmission error statistical means for outputting protection information created by summing up transmission errors based on the error information, frame synchronizing pattern comparing means for comparing the transmitted burst data with the bit string of a specified synchronizing pattern and outputting comparison information indicating a maximum noncoincidence bit number between the burst pattern and the synchronizing pattern and synchronization protecting means for selecting a permissible maximum noncoincidence bit number based on the protection information and outputting a frame synchronizing signal based on comparison information detected first within the maximum noncoincidence bit number.

According to the present invention, a transmission error produced during transmission of burst data is monitored and protection information created by summing up the statistics of transmission errors based on this error information is output. Bit strings are compared between the burst data at the time of transmission and a specified synchronizing pattern and comparison information based on the production state of noncoincidence bits is output. A permissible maximum noncoincidence bit number of the comparison information is selected based on the protection information and from this permissible noncoincidence bit number, a frame synchronizing signal satisfying a specified protection condition is output.

BRIEF DESCRIPTION OF THE DRAWINGS

This and other objects, features and advantages of the present invention will become more apparent upon a reading of the following detailed description and drawings, in which.

DESCRIPTION OF THE PREFERRED EMBODIMENTS

Figure 1:
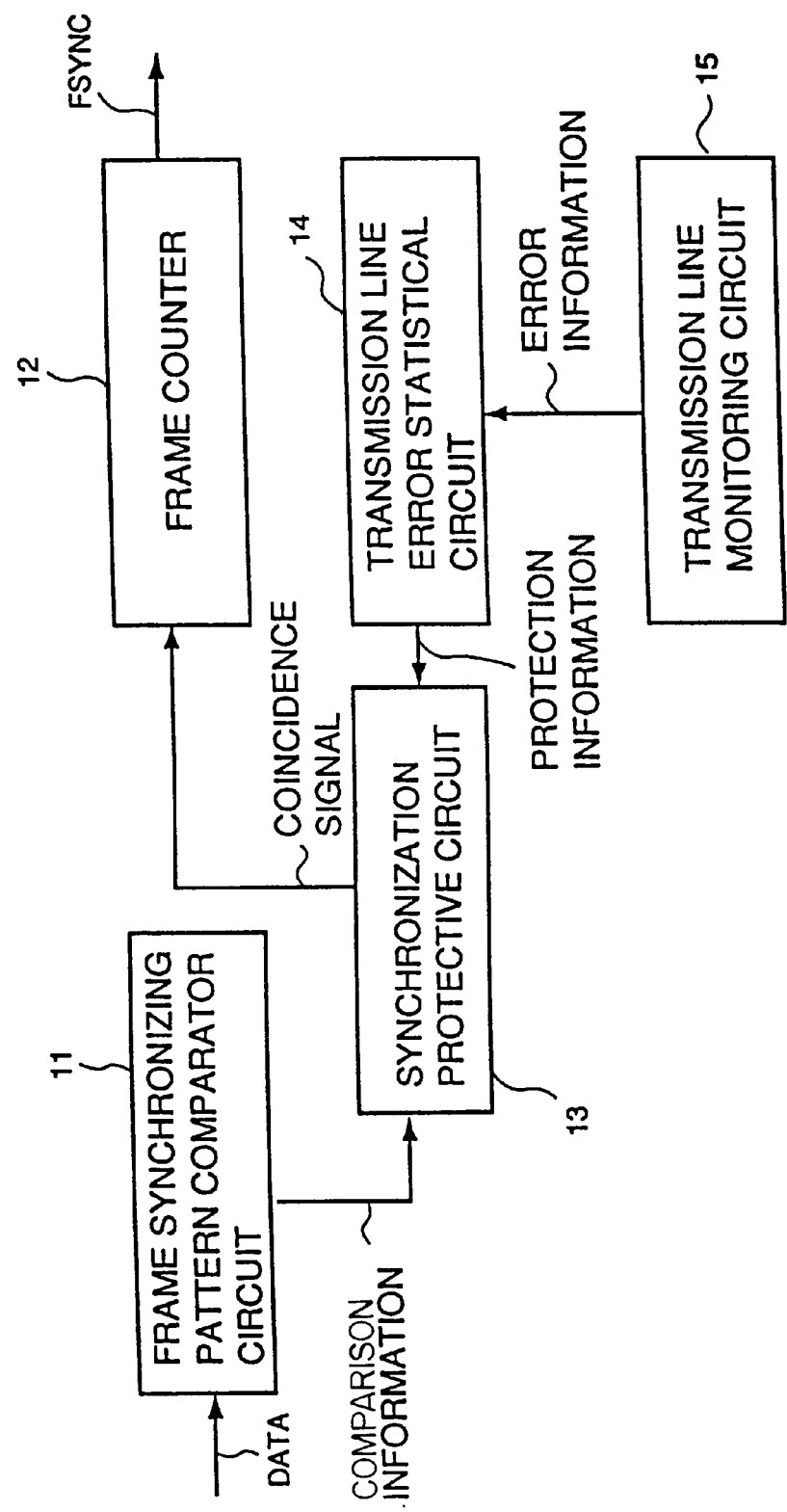
FIG. 1 is a block diagram showing a configuration example of a burst frame phase synchronizing circuit.
Figure 2:
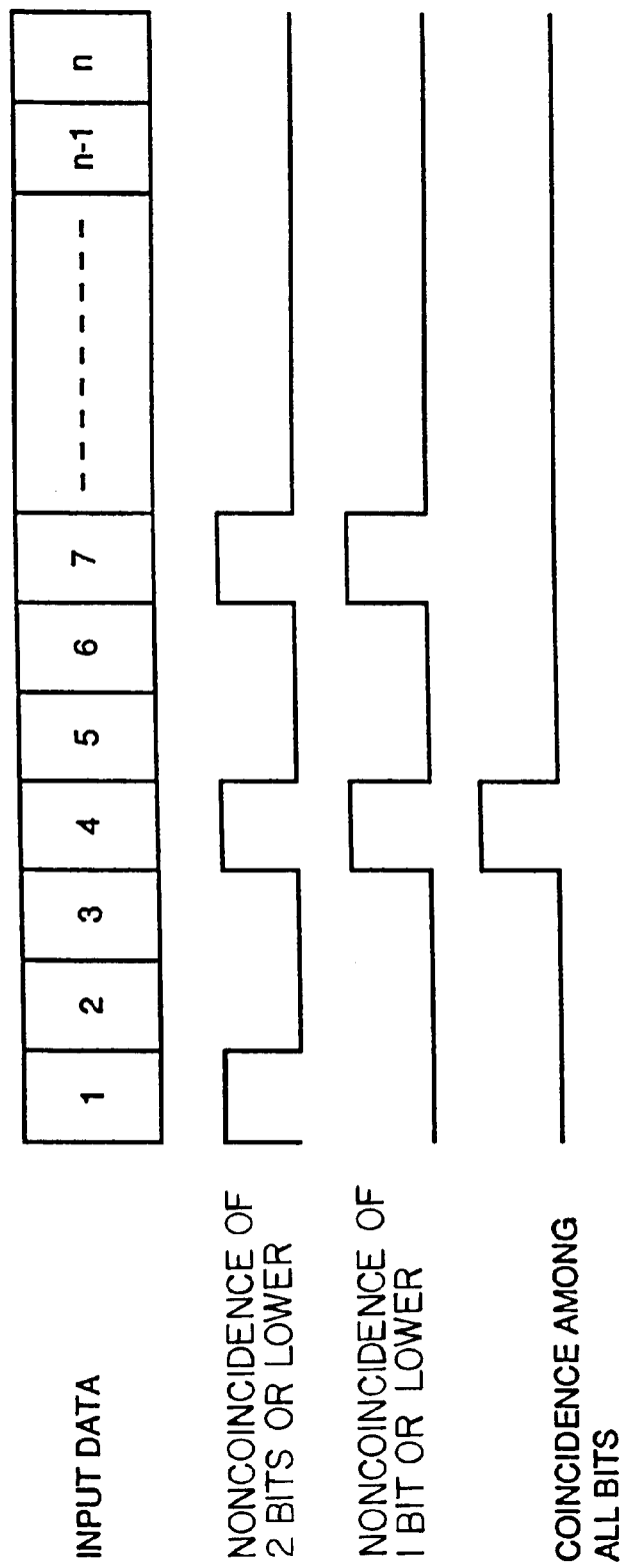
FIG. 2 is a timing chart illustrating an operation of a frame synchronizing pattern comparator circuit.
Figure 3:
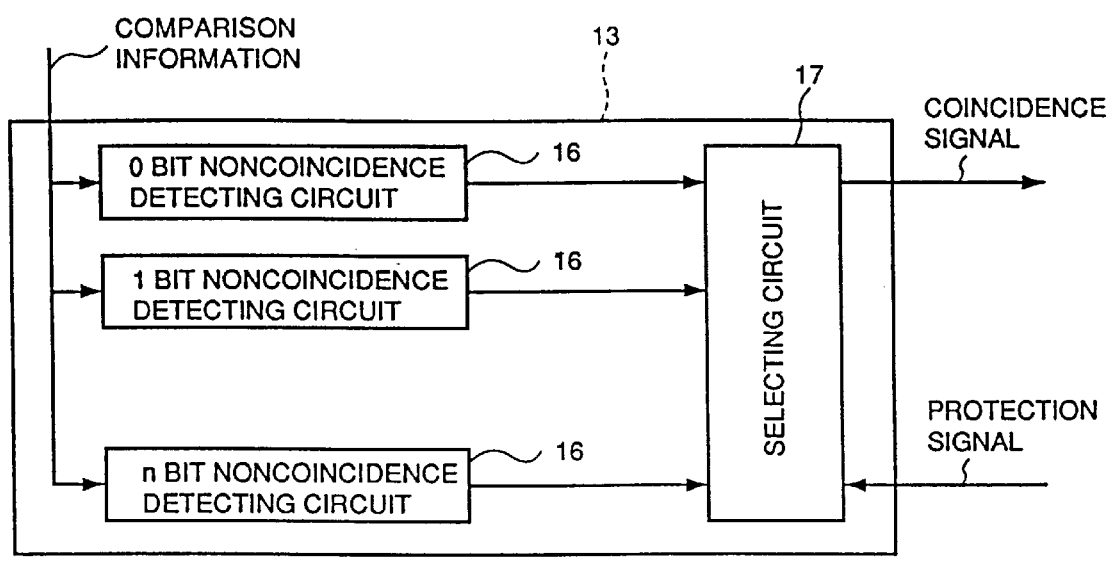
FIG. 3 is a block diagram showing in detail a configuration example of a synchronization protective circuit.
Figure 4:
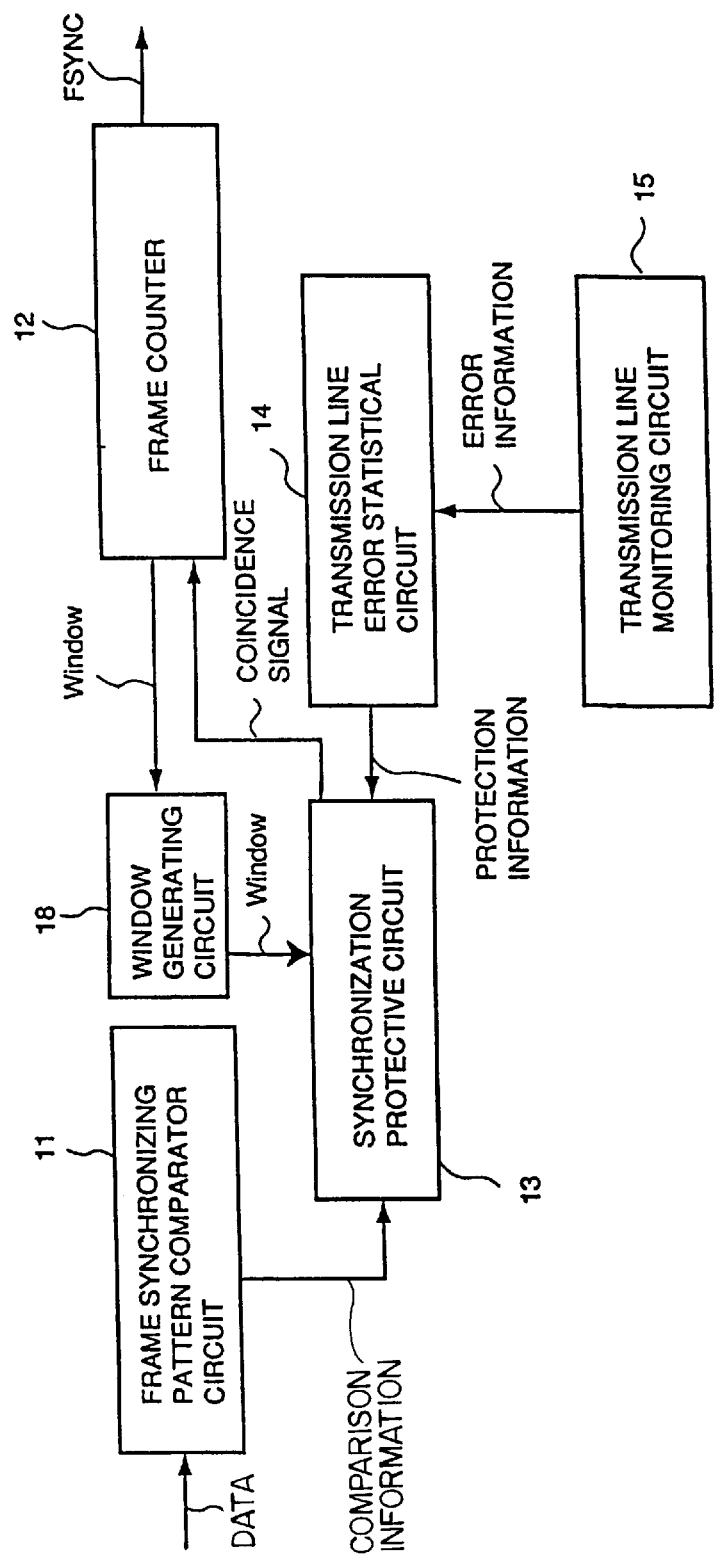
FIG. 4 is a block diagram showing a modified example of the present invention.
Figure 5:
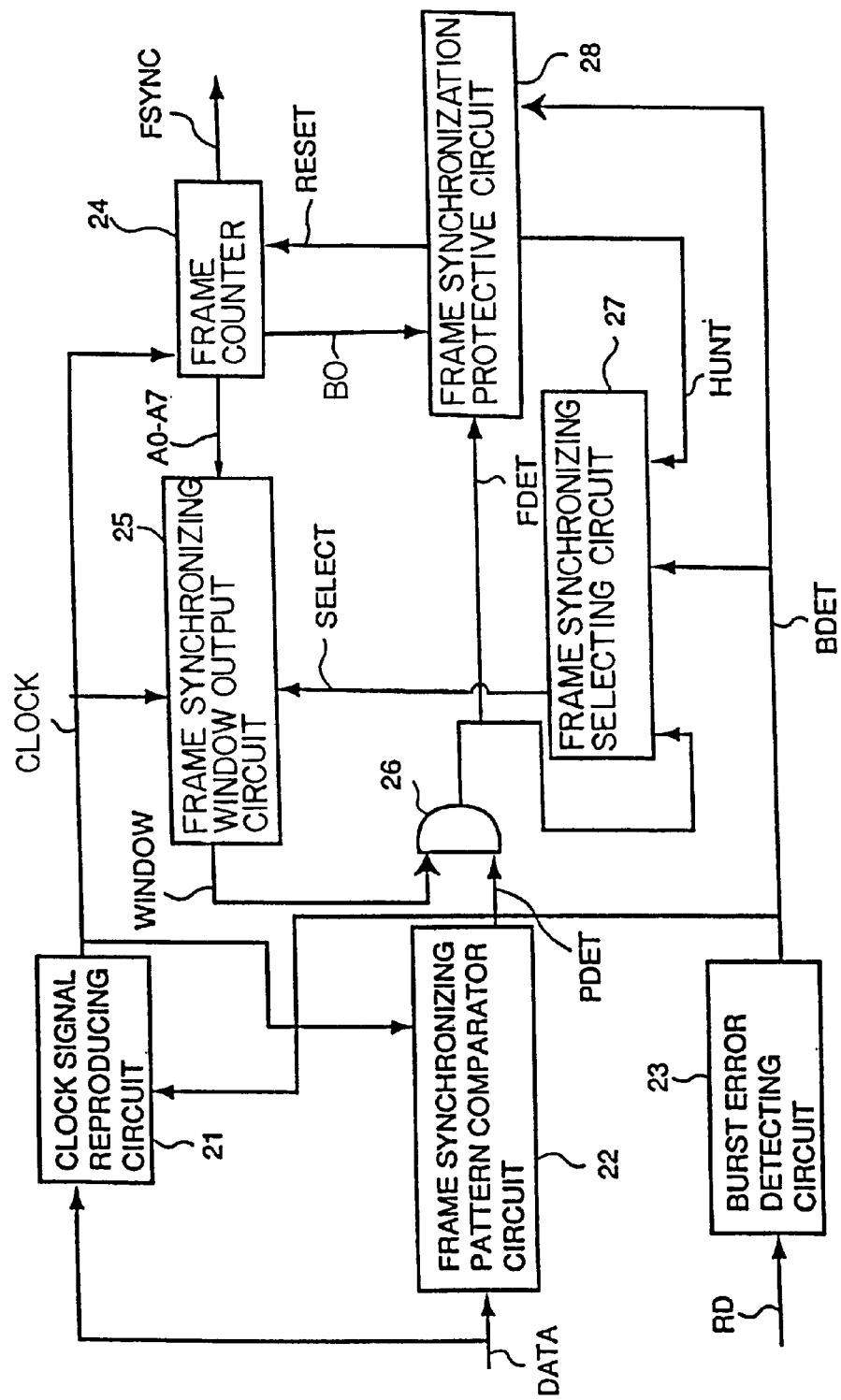
FIG. 5 is a block diagram showing a configuration example of a conventional burst frame phase synchronizing circuit.

Preferred embodiments of the burst frame phase synchronizing circuit of the present invention will be described in detail below with reference to the accompanying drawings. Referring to FIGS. 1 to 4, there is shown an embodiment of the burst frame phase synchronizing circuit of the present invention. Specifically, FIGS. 1 to 3 show a first the embodiment and FIG. 4 shows a modified example.

Referring now to FIG. 1, the burst frame phase synchronizing circuit includes a frame synchronizing pattern comparator circuit 11 for receiving input data DATA, a synchronization protective circuit 13 for receiving comparison information and protection information and outputting a coincidence signal, a frame counter 12 for counting phases based on the coincidence signal output from the synchronization protective circuit 13 and outputting synchronization information FSYNC, a transmission line error monitoring circuit 15 for outputting error information based on the result of observation and a transmission line error statistical circuit 14 for outputting protection information based on the received error information.

The frame synchronizing pattern comparator circuit 11 as one constituting element of the burst frame phase synchronizing circuit configured in the foregoing manner compares input data with a synchronizing pattern of its own and outputs comparison information for determining the number of noncoincidences according to the input phase of the data.

Referring now to FIG. 2, which is a timing chart showing the operation example of the frame synchronizing pattern comparator circuit 11, the frame synchronizing pattern comparator circuit 11 makes a comparison for bit strings between the burst signals 1, 2, 3–7, . . . , n–1 to n of received data DATA and the synchronizing pattern. Then, the circuit 11 outputs each of coincidence of all bits (noncoincidence of 0 bit), noncoincidence of 1 bit or lower and noncoincidence of 2 bits or lower with a timing shown in the drawing.

In FIG. 2, the timing signal of coincidence of all bits shows that the bit string of the received data DATA in which a burst signal 4 is a head and that of the synchronizing pattern are compared with each other, and all the bits coincide with one another and are synchronized with the phase of the burst signal 4.

In FIG. 2, the timing signal of noncoincidence of 1 bit or lower shows that the bit string of the received data DATA in which a burst signal 7 is a head and that of the synchronizing pattern are compared with each other, and 1 bit is in noncoincidence with the others and synchronized with the phase of the burst signal 7. Since a condition for noncoincidence of 1 bit or lower includes coincidence of all bits, a signal for all bit coincidence is also produced, being contained therein.

In FIG. 2, the timing signal of noncoincidence of 2 bits or lower shows that the bit string of the received data DATA in which a burst signal 1 is a head and that of the synchronizing pattern are compared with each other, and 2 bits are in noncoincidence with the others and synchronized with the phase of the burst signal 1. Since a condition for noncoincidence of 2 bits or lower includes all bit coincidence and 1 bit noncoincidence, a signal satisfying both conditions is produced, being contained therein.

The transmission line error monitoring circuit 15 outputs information on bit errors each having been observed for each burst signal as one bit of error information to the transmission error statistical circuit 14.

The transmission line error statistical circuit 14 performs statistical processing for the error information received from the transmission line error monitoring circuit 15 in the form of error frequency for a specified period, determines which monitoring system is necessary for performing frame synchronization and sends a resulting determination as protective information to the synchronization protective circuit 13. The above-noted statistical processing is performed, for instance in the form of error rates, and frame synchronism is acquired according to each error rate. The circuit 14 determines a bit error allowable value necessary for this processing and sends this value as protective information to the synchronization protective circuit 13.

The frame counter 12 counts phases based on the coincidence information received from the synchronization protective circuit 13 and outputs the counted result as synchronization information FSYNC.

The synchronization protective circuit 13 selects a permissible maximum coincidence number based on the protection information received from the transmission line error statistical circuit 14 and sends a pulse coincident with a protection condition (maximum noncoincidence bit number or lower) first detected in the comparison information received from the frame pattern comparator circuit 11 as a coincidence signal to the frame counter 12.

Referring now to FIG. 3 which is a block diagram showing the configuration example of the synchronization protective circuit 13 of the embodiment, this circuit 13 is composed of bit noncoincidence circuits 16, . . . 16 for detecting the bit noncoincidence of 0 to n bits and a selecting circuit 17 for selecting a coincidence signal from the output signals of the bit noncoincidence circuits 16, . . . 16 and outputting this signal.

The bit noncoincidence circuits 16, . . . 16 constituting the synchronization circuit 13 fetch noncoincidence information of 0 to n bits based on the comparison information output by circuit 11. Pulses synchronized with input phases in the comparison information are output respectively from the circuits 16, . . . 16. For example, if comparison information indicating noncoincidence of 2 bits or lower shown in FIG. 2 is input, a pulse synchronized with the phase of the burst signal 1 is output.

The selecting circuit 17 selects a pulse satisfying a first detected protection condition and outputs this pulse as a coincidence signal.

In the burst frame phase synchronizing circuit composed of the foregoing circuits, a processing procedure for input data DATA is as follows.

The frame synchronizing pattern comparator circuit 11 compares data DATA which has been input with a synchronizing pattern of its own and outputs a noncoincidence number complying with the input phase of the data as comparison information.

The transmission line error monitoring circuit 15 outputs the frequency of bit errors having been observed for each burst signal as error information. This error information is received by the transmission line error circuit 14. Statistical processing is then performed for the received error information, for instance by assassing an error frequency over a specified period of time. Finally a monitoring system necessary for acquiring frame synchronism is determined and the error information is output as protection information.

The synchronization protective circuit 13 selects a permissible maximum noncoincidence number based on the received protection information and sends a pulse satisfying the protection condition (maximum noncoincidence bit number or lower) in the comparison information from the frame pattern comparator circuit 11 as a coincidence signal to the frame counter 12.

The frame counter 12 counts phases based on the received coincidence information and outputs synchronization information FSYNC.

Next, the operation of the circuit shown in FIG. 1 will be described by referring to FIGS. 1 to 3.

When receiving a burst signal, the frame synchronizing pattern comparator circuit 11 makes a comparison for bit strings between received data and a synchronizing pattern and outputs comparison information indicating coincidence of all bits (0 bit noncoincidence), noncoincidence of 1 bit or lower, noncoincidence of 2 bits or lower, . . . , and noncoincidence of n bits or lower with a timing, by which a comparison was made with each input data.

When it is determined that no errors exist in the transmission line, synchronism may be established by the coincidence of all the bits. However, unless synchronism is acquired even for errors which are likely to occur at a specified rate in a normal transmission line, a problem occurs in the running of the system.

Accordingly, the rate of error occurrence during running of the system is monitored by the transmission line error monitoring circuit 15. Error information obtained by this monitoring is processed by the transmission line error statistical circuit 14 and output as protection information. Based on this protection information, coincidence accuracy of a synchronizing pattern complying with the condition of the transmission line is switched by the synchronization protective circuit 13. By this procedure, a synchronous bit can be detected with optimal synchronization accuracy according to the condition of the transmission line.

Referring now to FIG. 4 which shows a modified example of the embodiment, between the synchronization protective circuit 13 and the frame counter 12, there is provided a window generating circuit 18, which generates a window for limiting the range of synchronization referencing. In the case of burst transmission, since the range of position including synchronous bits is easily specified, a range for verifying synchronization can be limited by the window. Accordingly, no synchronization retrieval within an unnecessary range is necessary and the possibility of detecting erroneous synchronization can be reduced. The modified example is effective in further increasing the effects of the embodiment.

According to the foregoing embodiment and modified example, the burst frame phase synchronizing circuit changes the accuracy of synchronizing pattern referencing based on a transmission line error rate. Accordingly, by making pattern referencing strict when a transmission line error rate is low, the condition of erroneous synchronization caused by fluctuations in the receiving phase of the burst signal can be prevented.

Also, by providing the window in the synchronization observing position, the possibility of detecting an erroneous synchronizing pattern can be further reduced. These embodiments are only examples of the preferred modes of the present invention. Thus, the invention is not limited to these embodiments and various modifications and changes can be made within the scope of the teachings of the invention.

To summarize the foregoing description, the burst frame phase synchronizing circuit monitors a transmission error produced during transmission of burst data, outputs error information and also outputs protection information obtained by summing up the statistics of transmission errors based on this error information. In addition, the synchronizing circuit makes a comparison for bit strings between the burst data at the time of transmission and a specified synchronizing pattern and outputs comparison information based on the producing condition of noncoincidence bits. The circuit selects a permissible maximum noncoincidence number from the comparison information based on the protection information and outputs a frame synchronizing signal satisfying a specified condition from this permissible noncoincidence number.

Accordingly, the strength of synchronization protection is selected according to an error produced in the transmission line and no unnecessarily strong synchronization protecting measures are taken. As a result, a frame synchronous bit length can be limited to a necessary minimum and data transmission efficiency can be improved.

The entire disclosure of Japanese Patent Application No. 8-126854 filed on May 22, 1996 including specification, claims, drawings and summary are incorporated herein by reference in its entirety.

What is claimed is:

1. A burst frame phase synchronizing circuit for acquiring synchronism for each burst packet by using a synchronous bit set in a head of burst data, comprising:

transmission error monitoring means for monitoring a transmission error produced during transmission of said burst data and outputting error information;

transmission error statistical means for outputting protection information obtained by summing up transmission errors based on said error information;

frame synchronizing pattern comparing means for making a comparison for bit strings between said transmitted burst data and a specified synchronizing pattern and outputting comparison information indicating a noncoincidence bit number between said burst data and said synchronization pattern; and synchronization protecting means for selecting a permissible maximum noncoincidence bit number based on said protection information and outputting a frame synchronizing signal based on comparison information first detected to be less than or equal to said maximum noncoincidence bit number.

2. The burst frame phase synchronizing circuit of claim 1, further comprising a frame counter for correcting phase shifting of a produced frame synchronizing signal.

3. The burst frame phase synchronizing circuit of claim 1, wherein said synchronization protecting means includes means for selecting a permissible maximum noncoincidence bit number for each frame.

4. The burst frame phase synchronizing circuit of claim 1, further comprising window generating means for generating a window which limits a range for synchronization verification, and wherein said synchronization protecting means includes means for limiting a range for synchronization verification by said window.

5. A burst frame phase synchronizing circuit for acquiring synchronism for each burst packet by using a synchronous bit set in a head of burst data, comprising:

means for monitoring a transmission error produced during transmission of said burst data and outputting error information;

means for outputting protection information obtained by summing up transmission errors based on said error information;

means for detecting a noncoincidence bit number between said transmitted burst data and a synchronizing pattern for each possible phase and outputting a noncoincidence bit number signal synchronized with each one of said possible phases and indicating each of said noncoincidence bit numbers;

means for calculating a permissible maximum noncoincidence bit number based on said protection information and outputting a noncoincidence bit number signal detected first among said input noncoincidence bit number signals and satisfying a condition of being less than or equal to said maximum noncoincidence bit number, as a coincidence signal; and means for correcting phase shifting of said coincidence signal and outputting the corrected signal as a frame synchronizing signal.

6. The burst frame phase synchronizing circuit of claim 5, wherein said means for outputting said coincidence signal includes means for selecting a maximum noncoincidence bit number for each frame.

7. The burst frame phase synchronizing circuit of claim 5, wherein said means for outputting said coincidence signal includes a plurality of input phase pulse circuits provided correspondingly to said noncoincidence bit numbers for inputting said noncoincidence bit number signals and outputting pulses synchronized with input phases of said noncoincidence bit number signals and a selecting circuit for selecting, among pulses output from said plurality of input phase pulse circuits, a pulse output from one of said input phase pulse circuits corresponding to a condition of the number of noncoincidence bits being less than or equal to said maximum noncoincidence bit number.

8. The burst frame phase synchronizing circuit of claim 5, further comprising means for generating a window for limiting a range for synchronization verification, wherein said means for outputting said coincidence signal further includes means for limiting, according to said window, a period of outputting said coincidence signal.

9. A burst frame phase synchronizing circuit for acquiring synchronism for each burst packet by using a synchronous bit set in a head of burst data, comprising:

a transmission error monitoring circuit for monitoring a transmission error produced during transmission of said burst data and outputting error information;

a transmission error statistical circuit for outputting protection information obtained by summing up transmission errors based on said error information;

a frame synchronizing pattern comparator circuit for detecting a noncoincidence bit number between said transmitted burst data and a synchronizing pattern for each possible phase and outputting a noncoincidence bit number signal synchronized with each of said possible phases and indicating each of said noncoincidence bit numbers;

a plurality of pulse output circuits provided correspondingly to said noncoincidence bit numbers for inputting said noncoincidence bit number signals and outputting pulses synchronized with input phases of said noncoincidence bit number signals;

a selecting circuit for calculating a permissible maximum noncoincidence bit number based on said protection information, selecting, among pulses output from said plurality of input phase pulse circuits, a pulse output from one of said pulse circuits corresponding to a condition of being less than or equal to said maximum noncoincidence bit number and outputting this pulse as a coincidence signal; and a frame synchronizing circuit for correcting phase shifting of said coincidence signal and outputting this signal as a frame synchronizing signal.

10. A burst frame phase synchronizing method for acquiring synchronism for each burst frame by using a synchronous bit set in a head of burst data, comprising:

a step for monitoring a transmission error produced during transmission of said burst data and calculating error production frequency;

a step for calculating error frequency for a specified period based on said error production frequency;

a step for obtaining a permissible maximum noncoincidence bit number from noncoincidence bit numbers in bit strings between said burst data and a specified synchronizing pattern based on said error frequency for said specified period, said maximum noncoincidence bit number being permitted so as to acquire frame synchronism;

a step for making a comparison for bit strings between said burst data and said synchronizing pattern for each possible phase and detecting a noncoincidence bit number for each possible phase; and a step for establishing frame synchronization with a timing of a phase corresponding to a noncoincidence bit number which is less than or equal to said maximum noncoincidence bit number and is detected first.

11. The burst frame phase synchronizing method of claim 10, wherein a permissible maximum noncoincidence bit number is calculated for each frame.

12. The burst frame phase synchronizing method of claim 10, wherein a range for synchronization verification is limited.

* * * * *